Patented Jan. 28, 1936

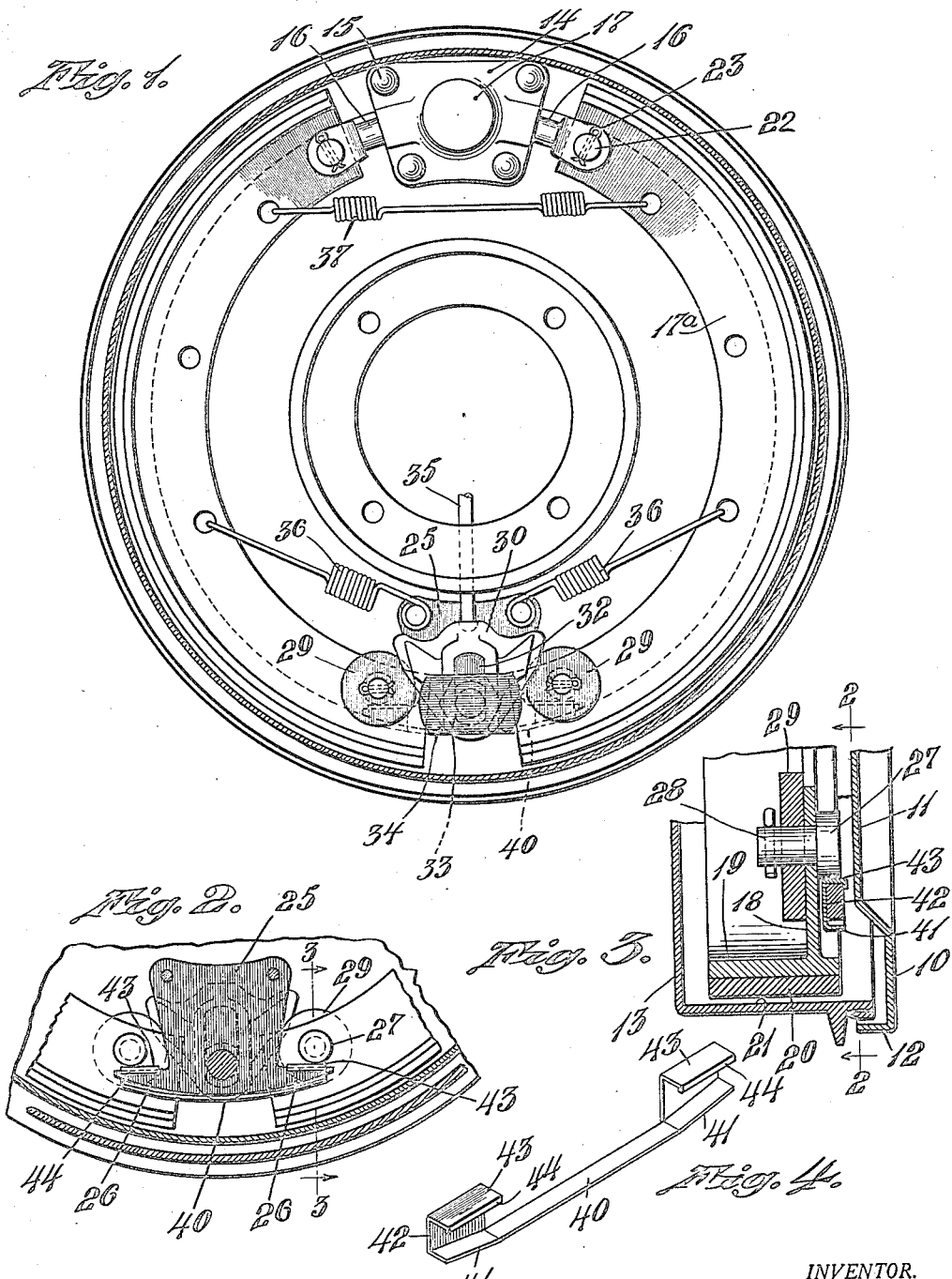

2,029,138

UNITED STATES PATENT OFFICE 2,029,138

BRAKE SHOE CENTRALIZING DEVICE

William Storrie, Providence, R. I., assignor to Lewis R. Smith, receiver for Apco Mossberg Corporation, a corporation of Rhode Island Application December 19, 1934, Serial No. 758,251

10 Claims. (Cl. 188—79.5)

This invention relates to a brake of the character used upon motor vehicles; and has for one of its objects the restoring of the brake after the parts of which have become worn thru use and out of place, to substantially its original and designed position for efficient operation.

Another object of the invention is to restore a brake of the above character which may have dropped thru wear to centralized position so that a chattering or jerky gripping action of the brake when applied in stopping the motor vehicle will not occur.

Another object of the invention is to facilitate handling thru the provision of a single unit which may be applied to resurface more than one worn part so as to substantially replace the amount of wear on these parts and thus restore them to substantially their original working relation.

Another object of the invention is the provision of a cover to extend over the original supporting surface of an arm when the same is worn away so that the pin which slides on this surface will then slide on the cover.

Another object of the invention is to connect two shoe aligning parts together in such a way that tension will be placed upon the part connecting them and the covers will assist in retaining the parts in the desired position on the arms of the supporting surfaces.

With these and other objects in view, the invention consists of certain novel features of construction, as will be more fully described, and particularly pointed out in the appended claims.

In the accompanying drawing:

Fig. 1 is primarily an elevational view of the non-rotating brake operating parts situated about the axle of a motor vehicle, altho showing in section the brake drum in its position.

Fig. 2 is a fragmental sectional view looking at the opposite side of the structure shown in Fig. 1.

Fig. 3 is a sectional view on substantially line 3—3 of Fig. 2.

Fig. 4 is a perspective view of my attachment or aligning device as separated from the brake-operating parts.

The brake operating mechanism which I have shown depicts very closely the mechanism which is used upon many automobiles; and it consists generally of a fixed plate 10 deflected as at 11 at its central portion and is provided with a flange 12 which extends circularly about the marginal edge of the brake drum 13 which is attached to and rotates with the wheel of the motor vehicle. Suitably secured to this plate 10 is a bracket 14 held in position by rivets 15, which bracket supports the adjustable arms 16 moved to different points of adjustment by the usual wedge mechanism housed within the cap 17 of the bracket and is thus hidden from view.

In the bifurcated end of each of these arms 16, there is pivotally mounted by means of pin 22 and cotter pin 23 an arcuate brake shoe 17a which is of a somewhat T-shaped construction altho the web portion 18 does not connect to the centre of the head 19 of the generally T-shaped layout. Each of the brake shoes is provided with a suitable friction lining 20 fastened to the face of the shoe on the outer part of the head 19 and is capable of engaging the inner surface 21 of the brake drum 13 when expanded to apply retarding pressure thereagainst.

Diametrically across from the bracket 14, there is mounted upon the plate 10 another bracket 25 which has oppositely extending arms 26 protruding from the bracket, which arms ordinarily serve as the supporting and guiding surface for the head 27. A pin 28 which extends thru the brake shoe serves to support the brake shoe at its lower free end while guiding it in its movement into engagement with the brake drum for retarding the motion of the wheel.

The pins 28 are also each rotatably supported on a roller 29. This pair of rollers 29 being better shown in Fig. 1 are engaged by the wedge element 30 which will force the rollers apart and move the shoes into frictional engagement with the drum. This wedge 30 is provided with a grooved edge so as to engage either side of the roller for guiding and directing the wedge in its movements. The wedge is slotted as at 32 so that it may be guided in its action about the flat surfaces 33 of the pin supported from the bracket 25. A head 34 is provided on one end of the pin to suitably guide the wedge on its side distant from the bracket 25 and a nut on the other end secures the pin in place.

The wedge is manipulated downwardly to force the rollers 29 apart or moved upwardly to relieve the rollers from such pressure by a rod 35 which extends at an angle thru the plate 10 and thence thru the king pin of the motor vehicle. When the wedge is moved downwardly to apply pressure to the rolls 29 and force the brake shoes apart, the movement of the shoes is retarded by springs 36 attached at the lower portion of the shoes and to the bracket 25 and spring 37 consisting of a long retarding spring at the upper end of the shoe and adjacent their pivotal mounting. These retarding springs also serve to bring the shoes inwardly toward each other upon being relieved of the pressure of the wedge so as to remove their frictional surfaces from contact with the drum.

The mechanism which I have described thus far relates to the operating parts of the brake. The heads 27 of the pins move along the upper surfaces of the arms 26 of the bracket 25 each time the brake is actuated and these surfaces wear to such an extent that the free ends of the shoes soon become lowered to such an extent that they touch the brake drum at these free ends first when the brake is applied and then jump to cause a momentary release and a chatter on the application of the brakes; and it is desired that these brake shoes shall be again lifted or restored to a position so that the braking surface will be more evenly distributed and contact will not occur locally at the free ends.

In order to avoid this objection, I have provided a single unit device such as shown in Fig. 4, consisting of a strip of sheet metal 40 providing an elongated body as shown and directed upwardly at 41 at either end. At right angles to the portion 41, this sheet metal is bent up as at 42 and again bent back at right angles as at 43 to extend generally parallel to the portion 40 or 41. There is also formed a lip 44 at the edge of the portion 43. These portions 43 perform the object to be accomplished as they are of such thickness that they replace the worn portion of the arm 26 and the head of pin 27 and again raise the shoes thru the head 27 and pin 28 to their proper centralized position. The remaining portion of the device serves to connect and properly position the portions 43, causing them to be so spaced as to be properly positioned and held on the arms.

The elongated connecting portion of the member 40 when applied in position extends under the bracket 25 and is bent down in its middle to be placed under tension such as is illustrated in Fig. 2, so that the inherent resiliency of the body portion 40 tends to cause the ends of the strip 40 and their centralizing members or covers 43 to bear snugly against the upper surface or worn portions of the arms 26 and there be held firmly in position. The portions 42 serve only as a suitable connection. This device needs no other attaching and thus may be easily and quickly placed within the brake mechanism to restore the shoes to normal, central operating position, thus avoiding the chatter which would take place because of the worn condition of the arms.

The sheet stock of the cover portions 43 may be of varying thicknesses to take up different amounts of wear, or may be variously connected to function together.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a brake, a pair of movable shoes, a support member provided with a supporting surface thereon, a spacing member on said surface, secured to said support member and means on said shoes to slidingly engage said member and support the shoes thereby.

2. In a brake, a pair of movable shoes, a support member provided with a pair of spaced supporting surfaces thereon, spacing members on said surfaces removably secured to said support member, and means on said shoes to slidingly engage said members and support the shoes thereby.

3. In a brake, a pair of movable shoes, a pair of spaced supporting surfaces, removable members on said surfaces, pins on said shoes to slidingly engage said members and support the shoes thereby, and means for connecting said members together.

4. In a brake, a pair of movable shoes, a pair of spaced supporting surfaces, members on said surfaces, and means on said shoes to slidingly engage said members and support the shoes thereby, said means for connecting said members together comprising a resiliently flexible bar placed under tension when in working position.

5. In a brake, a pair of movable shoes, a bracket having oppositely extending supporting arms, a members secured to said bracket and comprising portions to extend over said arms, and means on said shoes to slidingly engage said portions of said member.

6. In a brake, a pair of movable shoes, a bracket having oppositely extending supporting arms, a member comprising portions to extend over said arms and a portion distended to engage said bracket and place said member under tension, and means on said shoes to slidingly engage said portions of said members.

7. An attachment for a motor vehicle brake having brake shoes, roller supporting pins and surfaces on which said pins slide, comprising a member having integral means at each end to extend upwardly over the portion of said surfaces over which said pins slide and thereby provide engaging surfaces at a different position.

8. An attachment for a motor vehicle having brake shoes, roller supporting pins and surfaces on which said pins slide, comprising a single member having an elongated body with integral portions at each end extending at an angle thereto and then in a second direction over said body and adapted to cover the portion of said surfaces over which said pins slide to raise the surface to a different position.

9. An attachment for a motor vehicle having brake shoes, roller supporting pins and surfaces on which said pins slide, comprising a single member having an elongated body with integral portions at each end extending at an angle thereto and then in a second direction over said body and adapted to cover the portion of said surfaces over which said pins slide, and a lip on the edge of said covering portion to assist in retaining said attachment in positon.

10. An attachment for a motor vehicle brake having brake shoes, roller supporting pins and surfaces on which said pins slide, comprising a member having portions to cover said surfaces over which said pins slide and thereby provide engaging surfaces at a different position.

WILLIAM STORRIE.